US008582321B2

(12) United States Patent
Li et al.

(10) Patent No.: US 8,582,321 B2
(45) Date of Patent: Nov. 12, 2013

(54) RESONANT CONVERTERS AND BURST MODE CONTROL METHOD THEREOF

(75) Inventors: Zeng Li, Shanghai (CN); Jie Fu, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 331 days.

(21) Appl. No.: 13/004,491

(22) Filed: Jan. 11, 2011

(65) Prior Publication Data

US 2011/0176335 A1 Jul. 21, 2011

(30) Foreign Application Priority Data

Jan. 21, 2010 (CN) .......................... 2010 1 0002872

(51) Int. Cl.
*H02M 3/335* (2006.01)

(52) U.S. Cl.
USPC ...................................... 363/21.02

(58) Field of Classification Search
USPC .............. 363/13, 16, 17, 21.02, 21.03, 21.04, 363/21.1, 21.11, 21.12, 21.18, 132
See application file for complete search history.

(56) References Cited

U.S. PATENT DOCUMENTS

| 6,166,926 | A | 12/2000 | Nath et al. | |
|---|---|---|---|---|
| 7,848,118 | B2 * | 12/2010 | Shimada et al. | 363/17 |
| 7,944,715 | B2 * | 5/2011 | Zhang et al. | 363/21.02 |
| 2007/0165426 | A1 * | 7/2007 | Kyono | 363/21.02 |
| 2008/0043494 | A1 | 2/2008 | Jiao et al. | |
| 2011/0002145 | A1 * | 1/2011 | Halberstadt | 363/21.02 |

FOREIGN PATENT DOCUMENTS

WO    WO 2006/046220 A1    5/2006

* cited by examiner

*Primary Examiner* — Nguyen Tran
(74) *Attorney, Agent, or Firm* — Muncy, Geissler, Olds & Lowe, PLLC (57) ABSTRACT

A burst mode control method for a resonant converter is provided, in which at least one first regulation pulse is provided to pre-adjust a magnetizing inductor current and a resonant capacitor voltage in a resonant circuit during a burst mode working period. After the first regulation pulse is completed, at least one pulse group including a plurality of driving pulses is provided to intermittently turn on switching elements of a square wave generator. The first regulation pulse adjusts the magnetizing inductor current and the resonant capacitor voltage, such that the magnitude of the magnetizing inductor current is essentially the same and the magnitude of the resonant capacitor voltage is essentially the same at each rising edge of each driving pulse of the pulse group.

23 Claims, 8 Drawing Sheets

RESONANT CONVERTERS AND BURST MODE CONTROL METHOD THEREOF

CROSS REFERENCE TO RELATED APPLICATIONS

This application claims priority of China Patent Application No. 201010002872.3, filed on Jan. 21, 2010, the entirety of which is incorporated by reference herein.

BACKGROUND OF THE INVENTION

1. Field of the Invention

The present invention relates to a power supply, and particularly to a resonant converter utilizing burst mode control.

2. Description of the Related Art

Current trends in power supply development include higher efficiencies, higher power densities and lower costs, in addition to, environmentally friendliness and energy efficiency. Thus, resonant converters are widely used in the power supply field due to its ability to be soft-switched and operated under a state of a maximum duty cycle so that highly efficiency can be achieved when a resonant converter has a heavy load. However, when a resonant converter has a light load, operating efficiency is not desirable.

Figure 1:
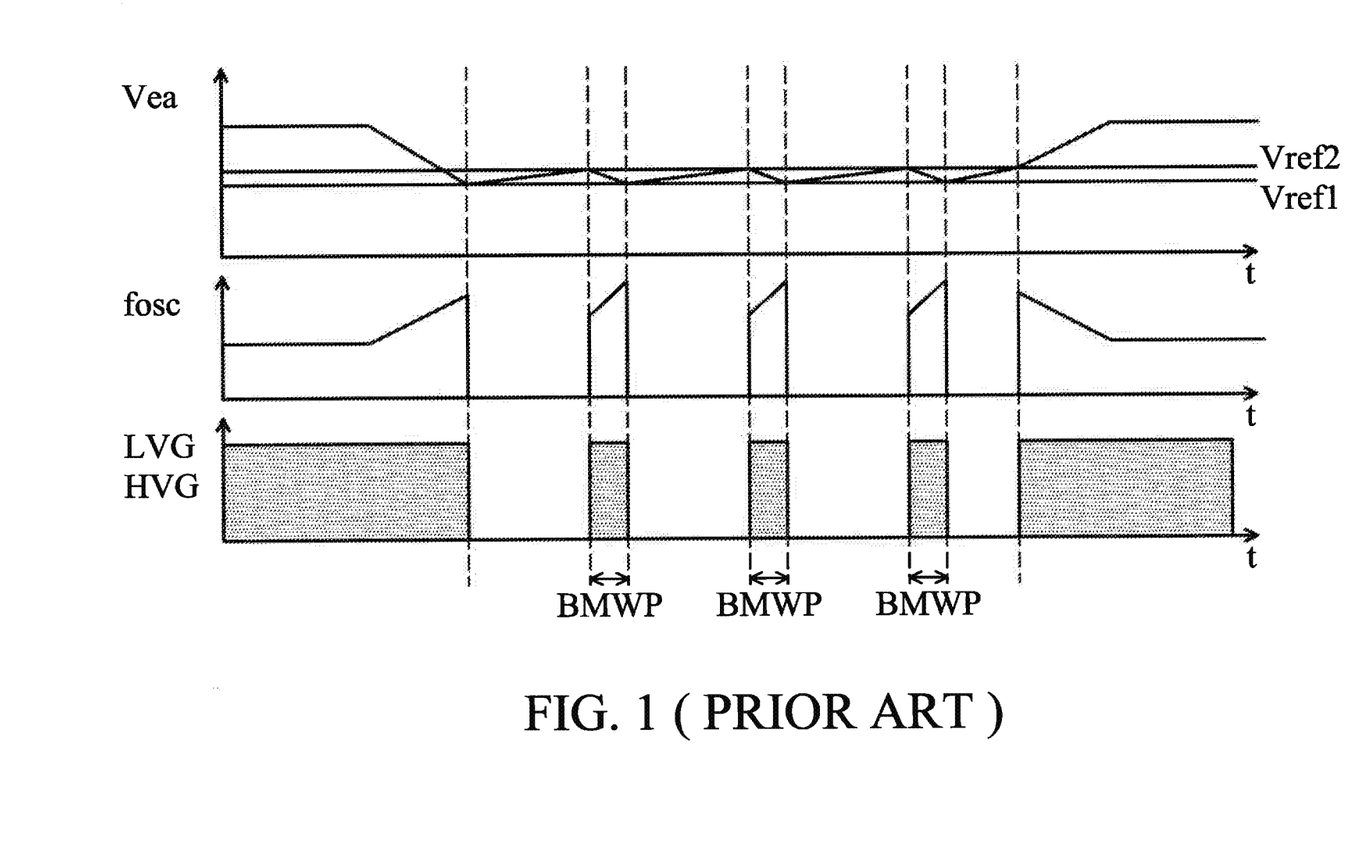
FIG. 1 depicts waveforms illustrating relative changes of the error amplifying signal Vea, the frequency of the oscillation signal fosc and the control signals (LVG and HVG) in a conventional resonant converter operated in a burst mode.

Accordingly, the conventional resonant converter is operated in a burst mode to minimize the amount of switching operations and loss per unit time for higher operating efficiency. For example, as shown in FIG. 1, when the error amplifying signal Vea is equal to or greater than the upper threshold voltage Vref2 of the hysteresis comparator, the voltage-frequency converter is enabled to generate an oscillation signal during the burst mode working period, such that the switching elements of the half-bridge converter are switched according to control signals (LVG and HVG). On the contrary, when the error amplifying signal Vea is less than the upper threshold voltage Vref1 of the hysteresis comparator, the voltage-frequency converter is disabled to stop generating the oscillation signal, such that there is no driving signal for the switching elements of the half-bridge converter.

Despite, improvements may still need to be made to the described burst mode control method for the resonant converter. For example, because the error amplifying signal Vea may fluctuate between the upper threshold voltage Vref2 and the lower threshold voltage Vref1 and the error amplifying signal Vea is inversely proportional to the frequency of the oscillation signal fosc, the frequency of the oscillation signal fosc, in a single burst mode working period (BMWP), is increased when the error amplifying signal Vea is reduced. In addition, during the first few driving pulse periods of the single BMWP, a large resonant current is appeared due to the reducing of resonant impedance (i.e. resonant current unbalance), so that causes many problems such as large output voltage ripple, large audio noise, optimum operation point variation (magnetic bias of magnetizing inductor current and failure of zero-voltage switching), and so on.

SUMMARY OF THE INVENTION

In light of the previously described problems, a burst mode control method and a resonant converter utilizing the burst mode control method capable of reducing output voltage ripple and audio noise and improving efficiency are required.

The invention provides a resonant converter, comprising a square-wave generator, a resonant circuit, an output rectifier circuit and a controller. The square-wave generator provides a square-wave voltage. The resonant circuit receives the square-wave voltage. The output rectifier circuit is coupled to the resonant circuit and outputs an output voltage. The controller provides a control signal for driving the square-wave generator during a burst mode working period, in which the control signal comprises at least one first pulse group and at least one second pulse group, the first pulse group comprises at least one first regulation pulse, and the second pulse group comprises a plurality of driving pulses. The square-wave generator pre-adjusts a magnetizing inductor current and a resonant capacitor voltage in the resonant circuit according to the first regulation pulse, such that the magnitude of the magnetizing inductor current is essentially the same and the magnitude of the resonant capacitor voltage is essentially the same at each rising edge of each driving pulse of the second pulse group.

The invention provides a resonant converter, comprising a square-wave generator, a resonant circuit, an output rectifier circuit and a controller. The square-wave generator provides a square-wave voltage. The resonant circuit receives the square-wave voltage. The output rectifier circuit coupled to the resonant circuit outputs an output voltage. The controller provides a control signal for driving the square-wave generator during a burst mode working period, in which the control signal comprises at least one first pulse group and at least two second pulse groups, the first pulse group is set between the two second pulse groups and comprises at least one first regulation pulse, and the second pulse groups each comprises a plurality of driving pulses. The square-wave generator adjusts a magnetizing inductor current and a resonant capacitor voltage in the resonant circuit according to the first regulation pulse, such that the magnitude of the magnetizing inductor current is essentially the same and the magnitude of the resonant capacitor voltage is essentially the same at each rising edge of each driving pulse of the second pulse group.

The invention provides a burst control method for a resonant converter, in which at least one first regulation pulse is provided to pre-adjust a magnetizing inductor current and a resonant capacitor voltage in a resonant circuit during a burst mode working period. After the first regulation pulse is completed, at least one pulse group comprising a plurality of driving pulses is provided to intermittently turn on switching elements of a square wave generator. The first regulation pulse adjusts the magnetizing inductor current and the resonant capacitor voltage, such that the magnitude of the magnetizing inductor current is essentially the same and the magnitude of the resonant capacitor voltage is essentially the same at each rising edge of each driving pulse of the pulse group.

BRIEF DESCRIPTION OF THE DRAWINGS

The present invention can be more fully understood by reading the subsequent detailed description and examples with references made to the accompanying drawings which are given by way of illustration only, and thus are not limitations of the present invention, wherein.

DETAILED DESCRIPTION OF THE INVENTION

The invention provides a resonant converter that pre-adjusts the magnetizing inductor current and the resonant capacitor voltage in the resonant circuit for minimizing output voltage ripple and audio noise, and improving efficiency of the resonant circuit.

Figure 2:
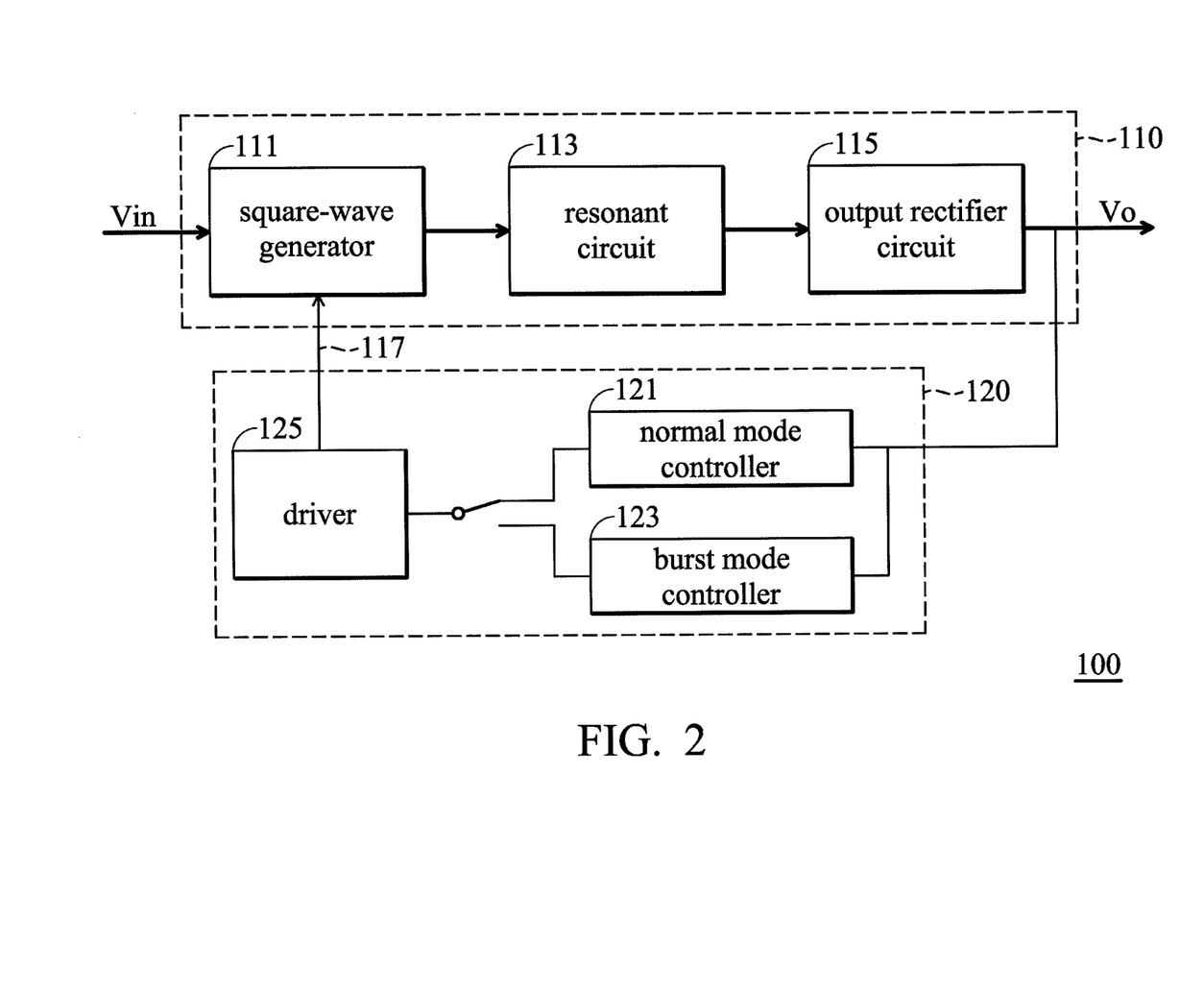
FIG. 2 depicts a diagram of a resonant converter according to an embodiment of the invention.

FIG. 2 depicts a diagram of a resonant converter according to an embodiment of the invention. As shown in FIG. 2, the resonant converter 100 comprises a main circuit 110 and a controller 120, in which the main circuit 110 comprises a square-wave generator 111, a resonant circuit 113 and an output rectifier circuit 115. The square-wave generator 111 provides a square-wave voltage to the resonant circuit 113. In the embodiment, the square-wave generator 111 may be a half-bridge converter, a full-bridge converter or a push-pull converter, but is not so limited thereto. The square-wave generator 111 receives an input voltage Vin, converts the input voltage Vin into the square-wave voltage according to a control signal 117 generated from the controller 120, and provides the square-wave voltage to the resonant circuit 113. Generally, the control signal 117 consists of a plurality of pulses.

The resonant circuit 113 consists of resonant elements (such as inductors and capacitors) and receives the square-wave voltage generated from the square-wave generator 111 for resonance (or resonance oscillation). The output rectifier circuit 115 is coupled to the resonant circuit 113 and outputs an output voltage Vo according to the resonance of the resonant circuit 113. For example, the output rectifier circuit 115 may be a diode rectifier circuit or a synchronous rectifier circuit, but is not limited thereto. The controller 120 comprises a normal mode controller 121, a burst mode controller 123 and a driver 125. The controller 120 determines the working mode for the resonant converter 100 according to a signal that reflects the output current in the resonant converter 100 (such as an error amplifying signal of the output voltage), and provides a corresponding control signal 117 to the square-wave generator 111. In some embodiments, the signal that reflects the output current in the resonant converter 100 may be one or more of the voltage across the resonant capacitor (also referred as resonant capacitor voltage hereinafter) or the current in the high frequency transformer (such as magnetizing inductor current or resonant current), but is not limited thereto. For example, the driver 125 outputs the control signal 117 to the square-wave generator 111 according to an oscillation signal provided by the normal mode controller 121 or the burst mode controller 123.

When the resonant converter 100 operates at full load or heavy load condition, the burst mode controller 123 is disabled, and the normal mode controller 121 is enabled. Meanwhile, the normal mode controller 121 generates the oscillation signal according to variation of the output voltage, and the driver 125 outputs the control signal 117 having continuous driving pulses to the square-wave generator 111 according to the oscillation signal generated by the normal mode controller 121. Namely, the resonant converter operates in a normal (working) mode.

When the resonant converter 100 operates at light load or No-load condition, the normal mode controller 121 is disabled, and the burst mode controller 123 is enabled. That is, the resonant converter 100 operates in a burst (working) mode. Meanwhile, the driver 125 outputs the control signal 117 comprising at least one first pulse group and at least one second pulse group to the square-wave generator 111, according to the oscillation signal generated by the burst mode controller 123. For example, the second pulse group comprises a pulse sequence having a plurality of driving pulses for intermittently turning on switching elements of the square wave generator 111, but is not limited thereto. Note that the first pulse group is antecedent to the second pulse group or is between two adjacent second pulse groups, but is not limited thereto. For example, the driver 125 sequentially provides the first and second pulse groups to the square-wave generator 111. The square-wave generator 111 pre-adjusts the magnetizing inductor current and the resonant capacitor voltage in the resonant circuit 113 to the predetermined values according to the first pulse group, such that the magnitude of the magnetizing inductor current is essentially the same and the magnitude of the resonant capacitor voltage is essentially the same at each rising edge of each driving pulse in the second pulse group. Namely, according to the second pulse group, the driver 125 makes the resonant converters 100 operate, like in a balanced (working) state, under a normal mode. Note that the resonant converter 100 has various balanced states under the normal mode, and the balanced states are associated with the loads. In addition, the difference between the resonant converters in FIG. 1 and FIG. 2 is that the second pulse group is generated by the driver 125 according to the oscillation signal with fixed frequency, which is generated by the burst mode controller 123. Namely, the second pulse group is not affected by the error amplifying signal generated according to the output voltage Vo even if the error amplifying signal fluctuates between the upper and lower threshold voltages of the hysteresis comparator.

In one embodiment, the first pulse group comprises one or more first regulation pulse(s), and the pulse widths and the amount of first regulation pulse(s) are determined according to the amount of the resonant elements in the resonant circuit 113, but is not limited thereto. In some embodiments, the amount of the first regulation pulse(s) is not greater than M+2 when the amount of resonant elements is M. In some embodiments, the first pulse group comprises one or more first pulse group(s) and one or more second pulse group(s) as well, and the pulse widths and the amount of first and second regulation pulse(s) are determined according to the amount of the resonant elements in the resonant circuit 113, but are not limited thereto. In some embodiments, the amount of the first and second regulation pulse(s) is not greater than N+2 when the amount of resonant elements is N. In some embodiments, the pulse widths of the first and the second regulation pulses are calculated from equations. In some embodiments, the pulse widths of the first and second regulation pulses are simultaneously adjusted by detecting one or more of the magnetizing inductor current, the resonant current and the resonant capacitor voltage in the resonant circuit; but are not limited thereto.

Because the first pulse group pre-adjusts the magnetizing inductor current and the resonant capacitor voltage in the resonant circuit to a predetermined value, it can prevent the resonant circuit 113 from generating a large resonant current during the first few driving pulse periods in the second pulse group. Therefore, the problems resulting from the unbalanced state of the resonant current can be solved by the foregoing, such as large output voltage ripple, audio noise and optimum operation point variation (magnetic bias of magnetizing inductor current and failure of zero-voltage switching) and so on.

Figure 3:
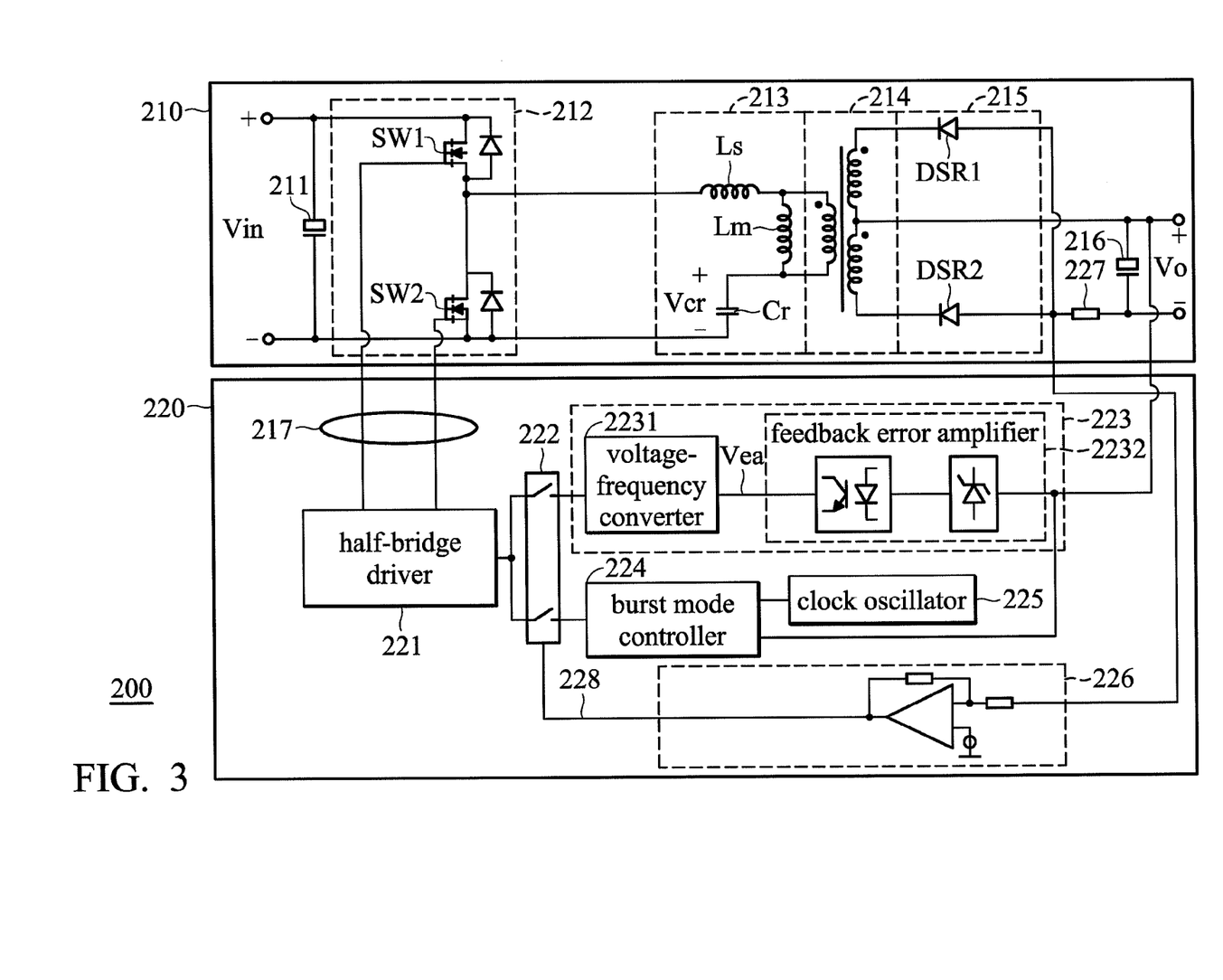
FIG. 3 depicts a diagram of a resonant converter according to an embodiment of the invention.

FIG. 3 depicts a diagram of a resonant converter according to an embodiment of the invention. As shown in FIG. 3, the resonant converter 200 comprises a main circuit 210 and a controller 220, in which the main circuit 210 comprises an input capacitor 211, a half-bridge converter 212, a resonant circuit 213, a high-frequency transformer 214, an output rectifier circuit 215 and an output capacitor 216. In the embodiment, the input capacitor 211 receives and stores the input voltage Vin, and the half-bridge converter 212 is used as a square-wave generator, which converts the input voltage Vin into a square-wave voltage according to the control signal 217 provided by the controller 220. In the embodiment, the half-bridge converter 212 consists of switching elements SW1 and SW2, but is not limited thereto. For example, the half-bridge converter 212 may consist of active semiconductor switching elements connected to diodes in parallel, such as insulated gate bipolar transistors (IGBTs), and micro-electro-mechanical switching devices (MEMS) and so on. The high-frequency transformer 214, output rectifier circuit 215 and output capacitor 216 are configured to be an output rectifier circuit, to provide an output voltage Vo. In the embodiment, the output rectifier circuit 215 consists of diodes DSR1 and DSR2, but is not limited thereto. The output rectifier circuit 215 may consist of other rectifier elements, such as synchronous rectifiers.

The controller 220 comprises a half-bridge driver 221, a selection switch 222, a normal mode controller 223, a burst mode controller 224, a clock oscillator 225, a hysteresis comparator 226 and a current detection resistor 227. The controller 220 determines the working mode for the resonant circuit 200 according to the output voltage Vo, and provides a corresponding control signal 217 to the half-bridge converter 212. The normal mode controller 223 consists of a voltage-frequency converter 2231 and a feedback error amplifier 2232. For example, the feedback error amplifier 2232 generates an error amplifying signal Vea according to a voltage difference between the output voltage Vo and a predetermined voltage, and the voltage-frequency converter 2231 outputs the corresponding oscillation signal according to the error amplifying signal Vea.

When the resonant converter operates at full load or heavy load condition, the burst mode controller 224 is disabled according to the output voltage Vo across the output capacitor 216, and the normal mode controller 223 is enabled and outputs the continuous oscillation signal. Meanwhile, the output signal 228 of the hysteresis comparator 226 controls the selection switch 222 to output the oscillation signal generated by the normal mode controller 223 to the half-bridge driver 221, as the voltage across the current detection resistor 227 is equal to or greater than the upper threshold voltage of the hysteresis comparator 226. Therefore, the half-bridge driver 221 outputs the control signal 217 according to the oscillation signal generated by the normal mode controller 223 for driving the half-bridge converter 212, such that the main circuit 210 of the resonant converter 200 operates under the normal mode. The operation under the normal mode of the main circuit 210 of the resonant converter 200 is similar to that for a conventional converter; hence no further description will be provided for brevity.

Figure 4:
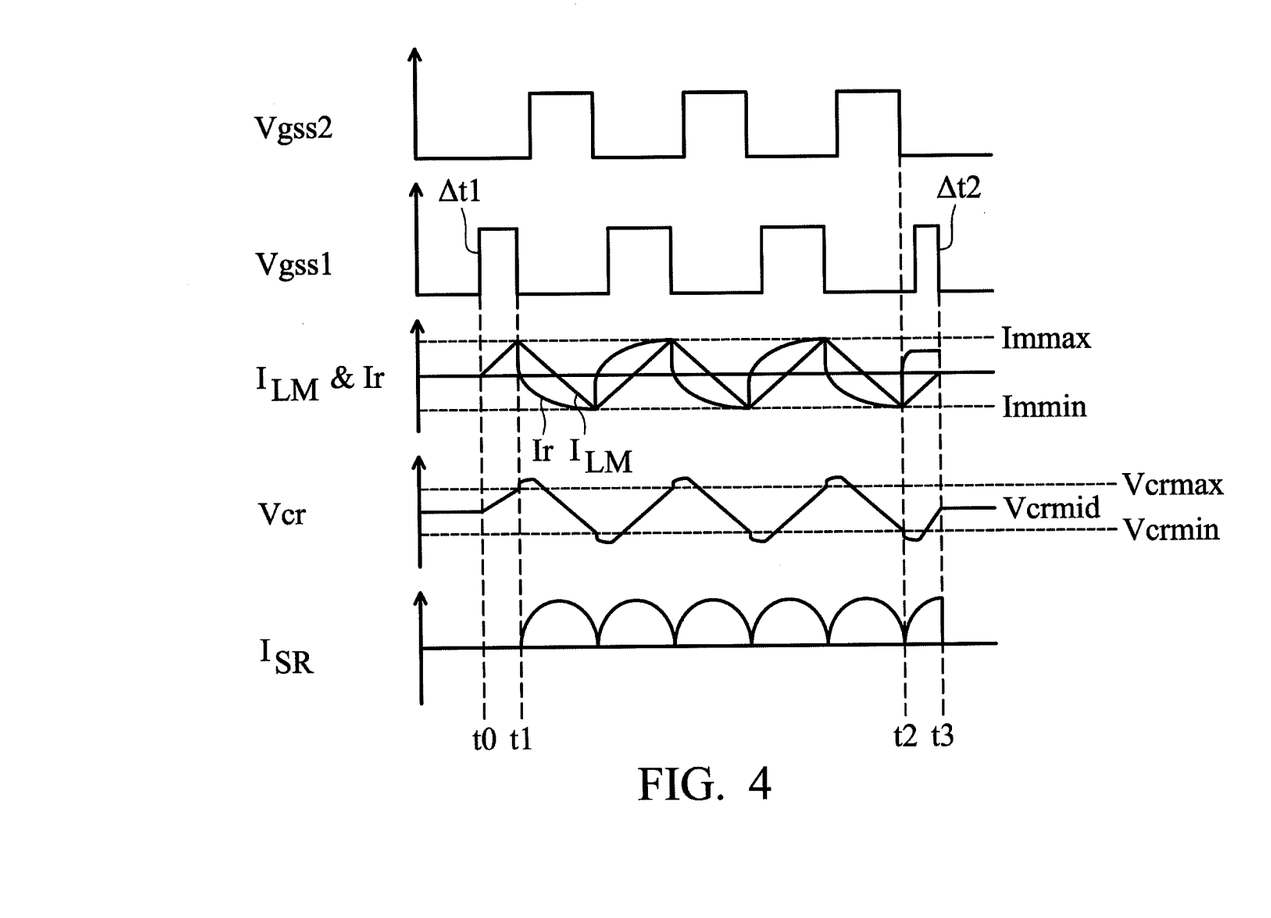
FIG. 4 depicts waveforms of the main circuit of the resonant converter during a burst mode operation according to an embodiment of the invention.

In some embodiments, the hysteresis comparator 226 controls the selection switch 222 according to one or more of the voltages Vcr across the resonant capacitor Cr (also referred as resonant capacitor voltage hereinafter), the current in the high-frequency transformer 214 (such as the magnetizing inductor current or resonant current) and the error amplifying signal Vea generated by the feedback error amplifier 2232, but is not limited thereto. The resonant converter 100 has various balanced states under the normal mode, and the balanced states are associated with the loads. As shown in FIG. 4, in one of the balanced states, the magnetizing inductor current $I_{LM}$ in the resonant circuit 213 has a positive peak value Immax and a negative peak value Immin, and the resonant capacitor voltage Vcr in the resonant circuit 213 has a first voltage value Vcrmax corresponding to the positive peak value Immax and a second voltage value Vcrmin corresponding to the negative peak value Immin.

When the resonant converter operates at light load or No-load condition, the normal mode controller 223 is disabled, and the burst mode controller 224 is enabled, so as to generate the corresponding oscillation signal according to the clock having a predetermined frequency, in which the clock is generated by the clock oscillator 225. Meanwhile, the output signal 228 of the hysteresis comparator 226 controls the selection switch 222 to output the oscillation signal generated by the burst mode controller 224 to the half-bridge driver 221, as the voltage across the current detection resistor 227 is equal to or less than the lower threshold voltage of the hysteresis comparator 226. Therefore, the half-bridge driver 221 outputs the control signal 217 according to the oscillation signal generated by the burst mode controller 224 to drive the half-bridge converter 212, such that the main circuit 210 for the resonant converter 200 operates under the burst mode.

In the embodiment, the control signal 217 output by the half-bridge driver 221 according to the oscillation signal generated by the burst mode controller 224 comprises at least one first pulse group and at least one second pulse group for controlling the switching element SW1 and SW2 in the half-bridge converter 212. FIG. 4 depicts waveforms of the main circuit of the resonant converter during a burst mode. As shown in FIG. 4, Vgss2 represents the driving signal of the switching element SW1 of the half-bridge converter 212, Vgss1 represents the driving signal of the switching element SW2 of the half-bridge converter 212, $I_{LM}$ represents the magnetizing inductor current in the magnetizing inductor Lm of the resonant converter 213, Ir represents the resonant current of the resonant circuit 213 (the current in the resonant inductor), Vcr represents the resonant capacitor voltage of the resonant circuit 213, and $I_{SR}$ represents the conducting current of diodes DSR1 and DSR2 of the output rectifier circuit 215.

In the embodiment, note that the control signal 217 consists of the driving signals Vgss2 and Vgss1, and the control signal 217 has a first regulation pulse Δt1 from time t0 to t1 and has a second regulation pulse Δt2 from time t2 to t3. The first and second regulation pulse Δt1 and Δt2 can be regarded as the first pulse group, and the pulse sequence from t1 to t2, consisting of a plurality of driving pulses, can be regarded as the second pulse group, but are not limited thereto. From time t0 to t1, the square-wave generator 212 turns on the switching element SW1 of the half-bridge converter 212 according to the first regulation pulse Δt1 to pre-adjust the resonant capacitor voltage Vcr and the magnetizing inductor current $I_{LM}$ from the intermediate value Vcrmid and 0, respectively, to the first voltage value Vcrmax and corresponding positive peak value Immax, respectively. Next, from time t1 to t2, the square-wave generator 212 sequentially turns on the switching elements SW2 and SW1 according to the driving pulses in the second pulse group of the control signal 217 (i.e. intermittently turns on the switching elements SW1 and SW2). Finally, from time t2 to t3, the square-wave generator 212 turns on the switching elements SW1 according to the second regulation pulse Δt2 to pre-adjust the resonant capacitor voltage Vcr and the magnetizing inductor current $I_{LM}$ to the intermediate value Vcrmid and 0, respectively.

From time t0 to t1, the first regulation pulse Δt1 pre-adjusts the resonant capacitor voltage Vcr and the magnetizing inductor current $I_{LM}$, such that the resonant circuit reaches a balanced state of resonant working (also referred to as a balanced state). In the embodiment, the balanced state of resonant working means balance of the resonant capacitor voltage Vcr and the magnetizing inductor current $I_{LM}$, and the resonant capacitor voltage Vcr and the magnetizing inductor current $I_{LM}$ are the same to those under the normal working mode. Thus, characteristics of zero-voltage switching for the resonant converter may be maintained. Namely, from time t1 to t2, the magnitude of the magnetizing inductor current $I_{LM}$ is essentially the same and the magnitude of the resonant capacitor voltage Vcr is essentially the same at each rising edge of each driving pulse of the control signal 217 for controlling the switching elements SW1 and SW2.

In the embodiment, the pulse widths of the first and the second regulation pulses Δt1 and Δt2 are calculated by following equations.

$$\Delta t1 = \frac{1}{\omega 1} \times tg^{-1}\left(\frac{\text{Im max}}{(Vin - Vcr\text{ max}) \times Cr \times \omega 1}\right)$$

$$Vcr(t0) = Vin - \sqrt{(Vin - Vcr\text{ max})^2 + \frac{\text{Im max}}{Cr \times \omega 1}}$$

$$Vcr(t0) = (nV0 + Vcr\text{ max} - Vin) \times \cos(\omega 0 \times \Delta t2) -$$
$$Lr \times \omega 0 \times \text{Im max} \times \sin(\omega 0 \times \Delta t2) + Vin - nV0$$

wherein $\omega 1 = \frac{1}{\sqrt{(Lr + Lm) \times gCr}}; \omega 0 = \frac{1}{\sqrt{Lr \cdot Cr}};$ Cr represents the resonant capacitance; Lr represents the resonant inductance; Lm represents the magnetizing inductance; Vin represents input voltage, n is the coil ratio that represents the coil numbers of primary-side relative to the coil numbers of the secondary-side of the high-frequency transformer 214; Immax represents the positive peak value of magnetizing inductor current $I_{LM}$; Vcrmax represents the voltage value across resonant capacitor Cr under the normal mode when the magnetizing inductor current $I_{LM}$ equals to the positive peak value; Vcrmin represents the voltage value across resonant capacitor Cr under the normal mode when the magnetizing inductor current $L_{IM}$ equals to the negative peak value; ω1 is the angular frequency at which the resonant circuit 213 oscillates under the first driving pulse (first regulation pulse); ω0 is the angular frequency at which the resonant circuit 213 oscillates under the last driving pulse (second regulation pulse); and Vcr(t0) represents the voltage across the resonant capacitance Cr at time t0.

In the embodiment, the resonant circuit 113 can be prevented from generating large resonant current during the first few driving pulse periods of the second pulse group because the frequency of the oscillation signal provided by the burst mode controller 224 from time t1 to t0 does not change with fluctuation of the error amplifying signal Vea, and the first pulse group pre-adjusts the magnetizing inductor current $I_{LM}$ and the resonant capacitor voltage Vcr in the resonant circuit to the predetermined value. In addition, the resonant converter 200 can meet requirements of output voltage ripple, audio noise and high performance under a light-load because it operates in a balanced state in the entire working period.

In one embodiment, because of the implementation of the first and the second regulation pulses, the peak value of the resonant current during the first few driving pulse periods in the second pulse group is less than 1.8 times that of the resonant current Ir in the balanced state of resonant working; thereby the resonant converter can meet general requirements for low output voltage ripple and audio noise. In another embodiment, the first and the second regulation pulses Δt1 and Δt2 are implemented according to the foregoing equations; hence the peak value of the resonant current during the first few driving pulse periods in the second pulse group is less than 1.4 times that of the resonant current Ir in the balanced state of resonant working. Thereby, the resonant converter can meet higher requirements for low output voltage ripple and audio noise. In a preferred embodiment, the first and the second regulation pulses Δt1 and Δt2 are further adjusted; hence the peak value of the resonant current during the first few driving pulse periods in the second pulse group is less than 1.2 times that of the resonant current Ir in the balanced state of resonant working. Thereby, the resonant converter can meet much higher requirements for low output voltage ripple and audio noise. In the embodiment of FIG. 4, the intermediate value Vcrmin of the resonant capacitor voltage Vcr is between the first voltage value Vcrmax and the second voltage value Vcrmin. In some embodiments, the intermediate value Vcrmin of the resonant capacitor voltage Vcr may be greater than that of the first voltage value Vcrmax or less than that of the second voltage value Vcrmin.

Figure 5:
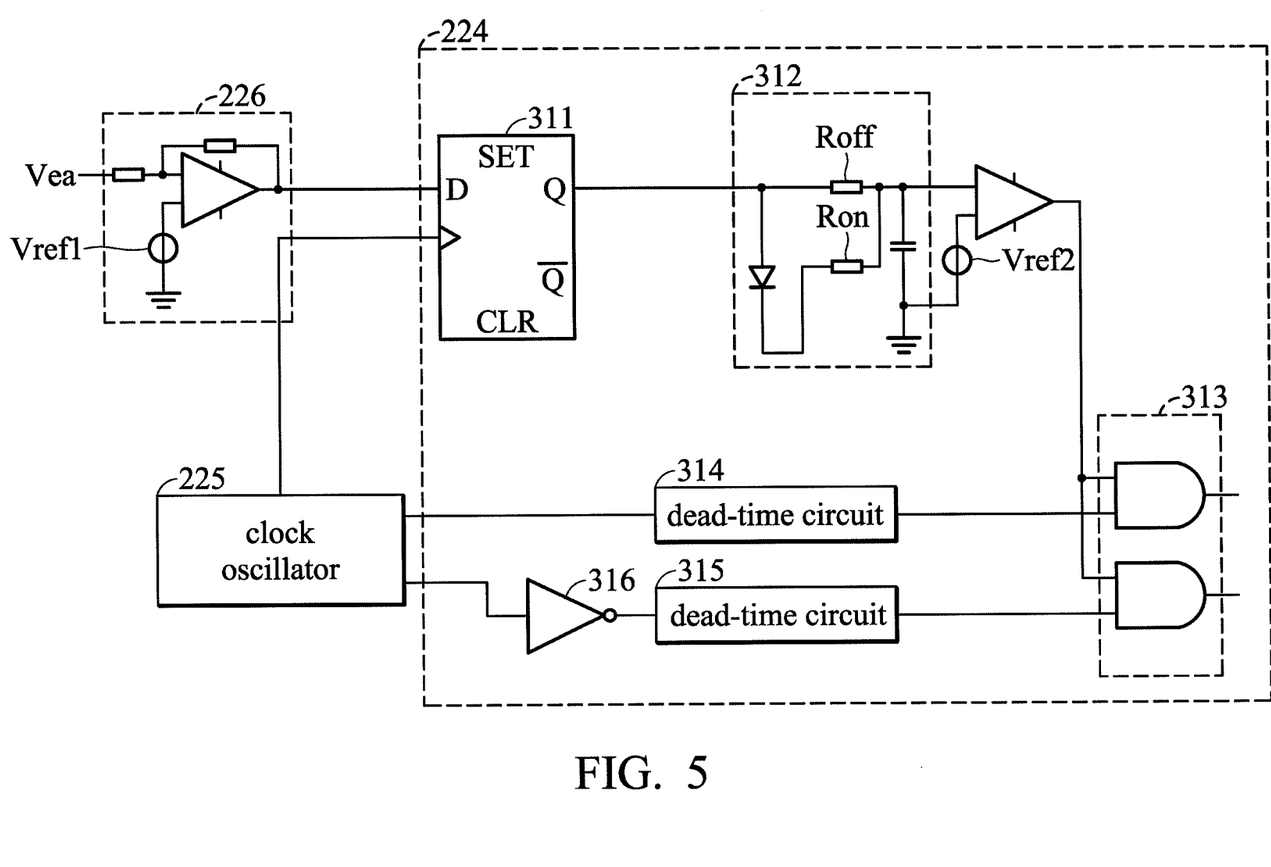
FIG. 5 depicts implantation of a burst working mode according to an embodiment of the invention.

FIG. 5 depicts implantation of a burst (working) mode. As shown in FIG. 5, the burst mode controller 224 comprises a driving pulse synchronization circuit 311, a predetermined pulse width circuit 312, an AND gate, dead-time circuits 314 and 315, and an inverter 316. The clock oscillator 225 generates an oscillation signal having a predetermined fixed frequency, and the hysteresis comparator 226 sets a threshold value for an error amplifying signal. The driving pulse synchronization circuit 311 synchronizes the output signals of the hysteresis comparator 226 with the driving pulses, and the predetermined pulse width circuit 312 sets the pulse widths for the first pulse (first regulation pulse) and the last pulse (second regulation pulse) during a resonant period by using a RC delay. The AND gate 313 controls the states of the driving pulses, and the dead-time circuits 314 and 315 generate the dead-time of conducting switching for the switching elements SW1 and SW2.

Figure 6:
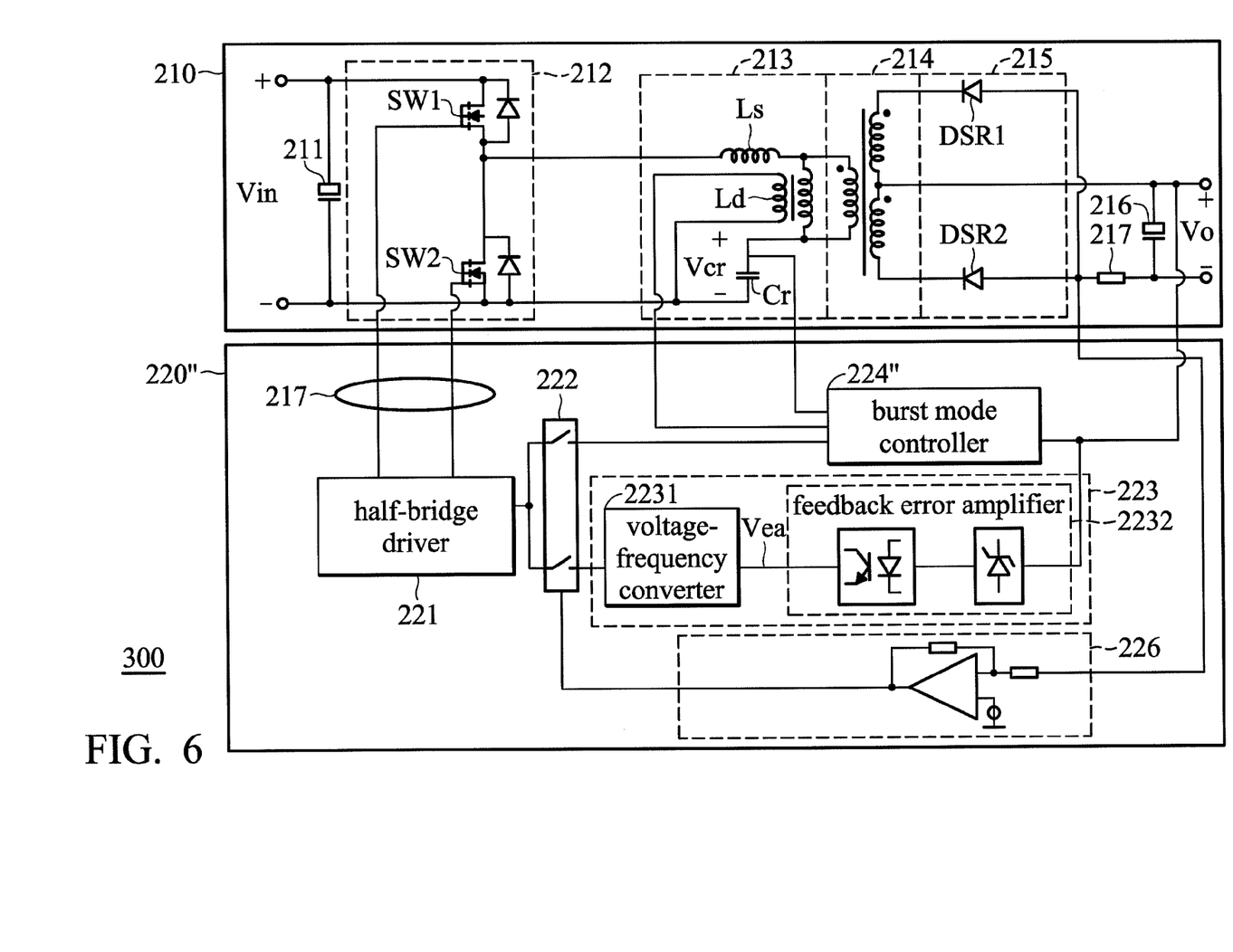
FIG. 6 depicts another embodiment of resonant converter according to an embodiment of the invention.

FIG. 6 depicts another embodiment of the resonant converter. As shown in FIG. 6, the resonant converter 300 is similar to the resonant converter 200 in FIG. 4, the difference is that the pulse widths of the first and the second regulation pulses Δt1 and Δt2 for the control signal 217 are simultaneously adjusted according to the detection of the magnetizing inductor current $I_{LM}$ and the resonant capacitor voltage Vcr rather than calculated by the above equations. Some elements in the resonant converter 300 are similar to the resonant converter 200 in FIG. 4, and thus, operations thereof are not described again here for brevity. As shown in FIG. 6, the controller 220" comprises an inductor Ld which acts as a magnetizing inductor current detection element for detecting the magnetizing inductor current $I_{LM}$ and the resonant capacitor voltage Vcr in the resonant circuit 210, and generates the detected magnetizing inductor current $I_{LM}$ to the burst mode controller 224". In addition, the controller 220" also generates the detected resonant capacitor voltage Vcr to the burst mode controller 224". The burst mode controller 224" instantaneously controls the pulse widths of the first and the second regulation pulses Δt1 and Δt2 according to the detected magnetizing inductor current $I_{LM}$ and the detected resonant capacitor voltage Vcr, such that the magnitude of the magnetizing inductor current $I_{LM}$ is essentially the same and the magnitude of the resonant capacitor voltage Vcr is essentially the same at each rising edge of each driving pulse of the second pulse group.

For example, when the resonant converter operates at light load or No-load, the normal mode controller 223 is disabled according to the output voltage Vo across the output capacitor, and the burst mode controller 224" is enabled for generating corresponding pulses. Meanwhile, the output signal 228 of the hysteresis comparator 226 controls the selection switch 222 to output the oscillation signal generated by the burst mode controller 224" to the half-bridge driver 221 when the voltage across the current detection resistor 227 is less than the lower threshold voltage of the hysteresis comparator 226. Therefore, the half-bridge driver 221 outputs the control signal 217 according to the oscillation signal generated by the burst mode controller 224" to drive the half-bridge converter 212, such that the main circuit 210 for the resonant converter 200 operates under the burst mode.

In the burst mode, the control signal 217 that is outputted by the half-bridge driver 221 according to the oscillation signal generated by the burst mode controller 224 comprises at least one first pulse group (such as the first and the second regulation pulses Δt1 and Δt2 in FIG. 4) and at least one second pulse group (such as the plurality of driving pulses from time t1 to t2 in FIG. 4) to control the switching elements SW1 and SW2 of the half-bridge converter 212. Before the second pulse group, the half-bridge driver 221 generates a first regulation pulse Δt1 according to the oscillation signal generated by the burst mode controller 220", so that the square-wave generator 212 respectively pre-adjusts the resonant capacitor voltage Vcr and the magnetizing inductor current $I_{LM}$ from the intermediate values Vcrmid and 0 to the first voltage value Vcrmax and the positive peak value Immax, such that the resonant converter 213 reaches the balanced state of resonant working. In the embodiment, the pulse width of the first regulation pulse is determined by the time required for adjusting the resonant capacitor voltage Vcr and the magnetizing inductor current $I_{LM}$ to the first voltage value Vcrmax and the positive peak value Immax, respectively. Once the burst mode controller 220" determines that the resonant capacitor voltage Vcr and the magnetizing inductor current $I_{LM}$ have been adjusted to the first voltage value Vcrmax and the positive peak value Immax respectively, the half-bridge driver 221 stops outputting the first regulation pulse Δt1.

Next, the half-bridge driver 221 outputs the second pulse group according to the oscillation signal generated by the burst mode controller 220", and the square-wave generator 212 sequentially turns on the switching elements SW1 and SW2 according to the second pulse group of the control signal 217. Furthermore, after the second pulse group is finished, the half-bridge driver 221 outputs a second regulation pulse Δt2 such that the square-wave generator 212 turns on the switching element SW1 according to the second regulation pulse Δt2 to respectively pre-adjust the resonant capacitor voltage Vcr and the magnetizing inductor current $I_{LM}$ to the intermediate value Vcrmin and 0. In the embodiment, the pulse width of the first regulation pulse is determined by the time required for adjusting the resonant capacitor voltage Vcr to the intermediate value Vcrmin. Once the burst mode controller 220" determines that the resonant capacitor voltage Vcr has been adjusted to the intermediate value Vcrmin, the half-bridge driver 221 stops outputting the second regulation pulse Δt2. In some embodiments, the second regulation pulseΔt2 is optional and can also be determined by the time required for adjusting the resonant capacitor voltage Vcr to the first voltage value Vcrmax or the magnetizing inductor current $I_{LM}$ to the positive peak value Immax.

Similarly, the resonant circuit 213 can be prevented from generating large resonant current during the first few driving pulse periods in the second pulse group because the first pulse group pre-adjusts the magnetizing inductor current $I_{LM}$ and the resonant capacitor voltage Vcr in the resonant circuit to the predetermined values, respectively. In addition, the resonant converter 300 can meet requirements for output voltage ripple, audio noise and high performance under a light-load because it operates in a balanced state in the entire working period.

Figure 7:
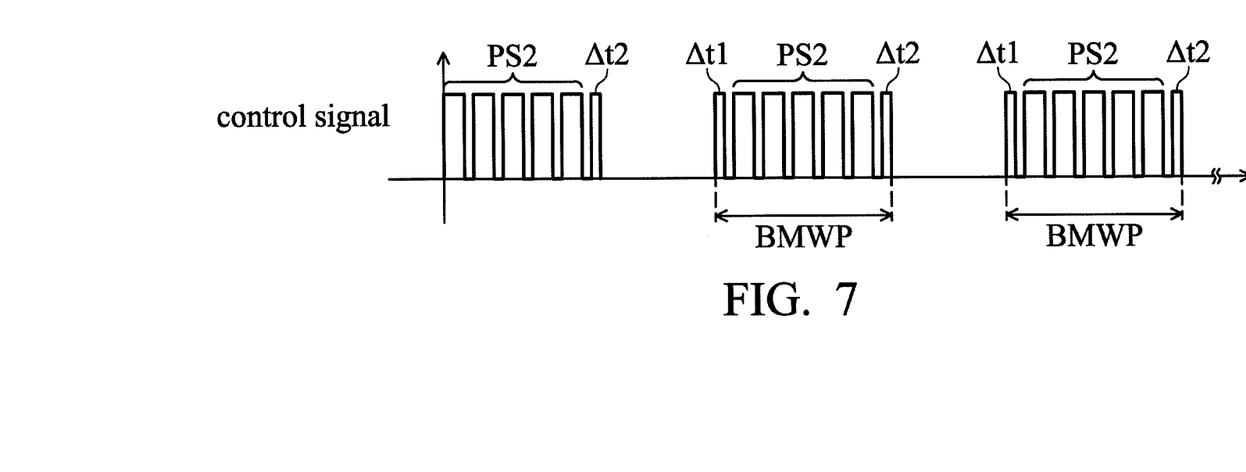
FIG. 7 depicts a waveform of the resonant converter during a burst mode operation according to an embodiment of the invention.

FIG. 7 depicts a waveform of the resonant converter during a burst mode. As shown in FIG. 7, the control signal comprises a first pulse group (Δt1 and Δt2) and a second pulse group (PS2) during each burst mode working period (BMWP). In the embodiment, the second pulse group PS2 is a pulse sequence having a plurality of driving pulses, and the first pulse group consists of the first regulation pulse Δt1 antecedent to the second pulse group and the second regulation pulse Δt2 subsequent to the second pulse group, but is not limited thereto. After the second pulse group, the second regulation pulse Δt2 adjusts the resonant capacitor voltage Vcr to the intermediate value Vcrmid, and before the second pulse group, the first regulation pulse Δt1 respectively adjusts the resonant capacitor voltage Vcr and the magnetizing inductor current $I_{LM}$ to the first voltage value Vcrmax and the positive peak value Immax. The resonant circuit can be prevented from generating a large resonant current during the first few driving pulse periods in the second pulse group PS2 because the first regulation pulse Δt1 has pre-adjusted the magnetizing inductor current $I_{LM}$ and the resonant capacitor voltage Vcr in the resonant circuit to the first voltage value Vcrmax and the positive peak value Immax, respectively, and hence the resonant circuit operates in a balance working state. Therefore, the magnitude of the magnetizing inductor current $I_{LM}$ is essentially the same and the magnitude of the resonant capacitor voltage Vcr is essentially the same at each rising edge of each driving pulse of the second pulse group PS2. Note that the pulse widths of the first and the second regulation pulses may be calculated from the above equations, or instantaneously adjusted by detecting the magnetizing inductor current $I_{LM}$ and the resonant capacitor voltage Vcr in the resonant circuit, but are not limited thereto. In some embodiments, the control signal during each BMWP may not include the second regulation pulse Δt2 and merely comprise a first regulation pulse Δt1 and a second pulse group PS2.

Figure 8:
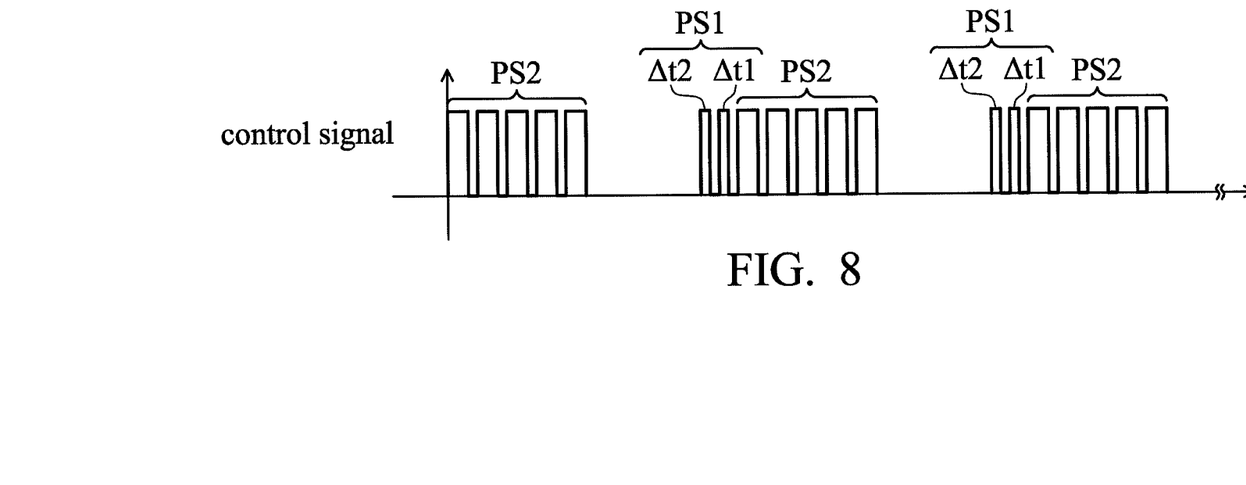
FIG. 8 depicts another waveform of the resonant converter during a burst mode operation according to an embodiment of the invention.

FIG. 8 depicts another waveform of the resonant converter during a burst mode. As shown in FIG. 8, the control signal comprises a first pulse group (Δt1 and Δt2) and a second pulse group (PS2) during each BMWP. In the embodiment, the second pulse group PS2 is a pulse sequence having a plurality of driving pulses, and the first pulse group PS1 consists of the first regulation pulse Δt1 and the second regulation pulse Δt2 antecedent to the second pulse group PS2, but is not limited thereto. Before the next second pulse group PS2, the second regulation pulse Δt2 adjusts the resonant capacitor voltage Vcr to the intermediate value Vcrmid, and then the first regulation pulse Δt1 respectively adjusts the resonant capacitor voltage Vcr and the magnetizing inductor current $I_{LM}$ from an intermediate value Vcrmid and 0 to the first voltage value Vcrmax and the positive peak value Immax, respectively, such that the magnitude of the magnetizing inductor current $I_{LM}$ is essentially the same and the magnitude of the resonant capacitor voltage Vcr is essentially the same at each rising edge of each driving pulse of the second pulse group PS2. Similarly, the pulse widths of the first and the second regulation pulses may be calculated from the above equations, or instantaneously adjusted by detecting the magnetizing inductor current $I_{LM}$ and the resonant capacitor voltage Vcr in the resonant circuit, but are not limited thereto. In some embodiments, the control signal in the first pulse group PS1 during each BMWP may not include the second regulation pulse Δt2 and only comprise a first regulation pulse Δt1.

Figure 9:
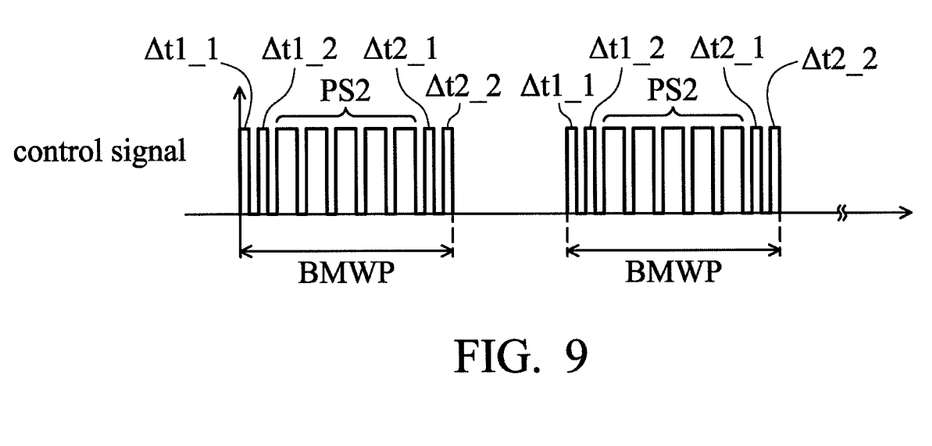
FIG. 9 depicts another waveform of the resonant converter during a burst mode operation according to an embodiment of the invention.

FIG. 9 depicts another waveform of the resonant converter during a burst mode. As shown in FIG. 9, the control signal during each BMWP comprises a first pulse group (Δt1_1, Δt1_2, Δt2_1 and Δt2_2) and a second pulse group (PS2). In the embodiment, the second pulse group PS2 is a pulse sequence having a plurality of driving pulses, and the first pulse group PS1 consists of the first regulation pulses Δt1_1 and Δt1_2 antecedent to the second pulse group PS2 and the second regulation pulses Δt2_1 and Δt2_2 subsequent to the second pulse group PS2, but is not limited thereto. For example, the first regulation pulses Δt1_1 and Δt1_2 can be regarded as a pulse sequence, and the second regulation pulses Δt2_1 and Δt2_2 can be regarded as another pulse sequence.

After the last second pulse group PS2, the second regulation pulses Δt2_1 and Δt2_2 adjust the resonant capacitor voltage Vcr to the intermediate value Vcrmid, and before the next second pulse group PS2, the first regulation pulses Δt1_1 and Δt1_2 respectively adjust the resonant capacitor voltage Vcr and the magnetizing inductor current $I_{LM}$ from the intermediate values Vcrmid and 0 to the first voltage value Vcrmax and the positive peak value Immax. The resonant converter can be prevented from generating large resonant current during the first few driving pulse periods in the second pulse group because the first regulation pulses Δt1_1 and Δt1_2 pre-adjust the magnetizing inductor current $I_{LM}$ and the resonant capacitor voltage Vcr in the resonant circuit 300 to the first voltage value Vcrmax and the positive peak value Immax. Therefore, the magnitude of the magnetizing inductor current $I_{LM}$ is essentially the same and the magnitude of the resonant capacitor voltage Vcr is essentially the same at each rising edge of each driving pulse of the second pulse group PS2. Note that the pulse widths of the first and the second regulation pulses may be calculated from the above equations, or instantaneously adjusted by detecting the magnetizing inductor current $I_{LM}$ and the resonant capacitor voltage Vcr, but are not limited thereto. In some embodiments, the first pulse group may comprise more first and second regulation pulses than the embodiments described herein. For example, the amount of the first regulation pulses and the second regulation pulses in the first pulse group can be determined according to the amount of the resonant elements in the resonant circuit. In some embodiments, the amount of the first and second regulation pulse(s) is not greater than N+2 when the amount of resonant elements is N. In some embodiments, the control signal during each BMWP may not include the second regulation pulses Δt2_1 and Δt2_2 and only comprise a first pulse group (Δt1_1 and Δt1_2) and a second pulse group (PS2). In some embodiments, the amount of the first regulation pulse(s) is not greater than M+2 when the amount of resonant elements is M.

When the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A resonant converter, suitable for operating in a normal mode or a burst mode, the resonant converter comprising:
   a square-wave generator for providing a square-wave voltage;
   a resonant circuit, receiving the square-wave voltage; and
   a controller, providing a control signal for driving the square-wave generator during a burst mode working period of the burst mode, wherein the resonant converter operates at light load or No-load condition during the burst mode, the control signal comprises at least one first pulse group and at least one second pulse group, the first pulse group comprises at least one first regulation pulse, and the second pulse group comprises a plurality of driving pulses, and the square-wave generator pre-adjusts a magnetizing inductor current and a resonant capacitor voltage in the resonant circuit according to the first regulation pulse, such that at each rising edge of each driving pulse of the second pulse group the magnitude of the magnetizing inductor current is essentially the same and the magnitude of the resonant capacitor voltage is essentially the same.

2. The resonant converter as claimed in claim 1, wherein the pulse width of the first regulation pulse is instantaneously adjusted by detecting the magnetizing inductor current and the resonant capacitor voltage.

3. The resonant converter as claimed in claim 1, wherein the magnetizing inductor current has a positive peak value and a negative peak value, and the resonant capacitor voltage has a first voltage value corresponding to the positive peak value, a second voltage value corresponding to the negative peak value and an intermediate value, when the resonant converter operates in a balanced state under the normal mode.

4. The resonant converter as claimed in claim 3, wherein the square wave generator respectively pre-adjusts the magnetizing inductor current and the resonant capacitor voltage to the positive peak value and the first voltage value, respectively, according to the first regulation pulse.

5. The resonant converter as claimed in claim 3, wherein the second pulse group is subsequent to the first regulation pulse, and the first pulse group further comprises at least one second regulation pulse subsequent to the second pulse group, and the square-wave generator adjusts the resonant capacitor voltage in the resonant circuit according to the second regulation pulse.

6. The resonant converter as claimed in claim 3, wherein the first pulse group further comprises at least one second regulation pulse preceding to the first regulation pulse, and the second pulse group is subsequent to the first regulation pulse, and the square-wave generator adjusts the resonant capacitor voltage in the resonant circuit to the intermediate value according to the second regulation pulse.

7. The resonant converter as claimed in claim 3, wherein the pulse width of the first regulation pulse is determined by the time required for adjusting the resonant capacitor voltage and the magnetizing inductor current to the first voltage value and the positive peak value, respectively.

8. The resonant converter as claimed in claim 3, wherein the first pulse group comprises a plurality of first regulation pulses, and the second pulse group is subsequent to the plurality of first regulation pulses, such that the square-wave generator respectively pre-adjusts the magnetizing inductor current and the resonant capacitor voltage to the positive value and the first voltage value.

9. The resonant converter as claimed in claim 8, wherein the first sequence further comprises a plurality of second regulation pulses subsequent to the second pulse group, such that the square-wave generator adjust the resonant capacitor voltage to the intermediate value.

10. The resonant converter as claimed in claim 9, wherein the amount of the first and second regulation pulse(s) is not greater than N+2 when the amount of resonant elements is N.

11. A resonant converter, suitable for operating in a normal ode or a burst mode, the resonant converter comprising:
a square-wave generator for providing a square-wave voltage;
a resonant circuit, receiving the square-wave voltage; and
a controller, providing a control signal for driving the square-wave generator during a burst mode working period of the burst mode, wherein the resonant converter operates at light load or No-load condition during the but mode, the control signal comprises at least one first pulse group and at least two second pulse groups, the first pulse group is set between the two second pulse groups and comprises at least one first regulation pulse, and the square-wave generator adjusts a magnetizing inductor current and a resonant capacitor voltage in the resonant circuit according to the first regulation pulse, such that at each rising edge of each driving pulse of the second pulse groups the magnitude of the magnetizing inductor current is essentially the same and the magnitude of the resonant capacitor voltage is essentially the same.

12. The resonant converter as claimed in claim 11, wherein the magnetizing inductor current has a positive peak value and a negative peak value, and the resonant capacitor voltage has a first voltage value corresponding to the positive peak value, a second voltage value corresponding to the negative peak value and an intermediate value, when the resonant converter operates in a balanced state under the normal mode.

13. The resonant converter as claimed in claim 12, wherein the square-wave generator respectively adjusts the magnetizing inductor current and the resonant capacitor voltage to the positive peak value and the first voltage value, respectively, according to the first regulation pulse.

14. The resonant converter as claimed in claim 12, wherein the first pulse group further comprises at least one second regulation pulse subsequent to one of the second pulse groups, such that the square-wave generator adjusts the resonant capacitor voltage in the resonant circuit to the intermediate value.

15. The resonant converter as claimed in claim 12, wherein the first pulse group further comprises at least one second regulation pulse antecedent to the first regulation pulse, and the square-wave generator adjusts the resonant capacitor voltage in the resonant circuit to the intermediate value according to the second regulation pulse.

16. The resonant converter as claimed in claim 12, wherein the amount of the first regulation pulse(s) is not greater than M+2 when the amount of resonant elements is M.

17. The resonant converter as claimed in claim 12, wherein the pulse width of the first regulation pulse is instantaneously adjusted by detecting the magnetizing inductor current and the resonant capacitor voltage.

18. A burst mode control method for a resonant converter, wherein the resonant converter is suitable for operating in a normal mode or a burst mode, the burst mode control method comprising:
providing at least one first regulation pulse to pre-adjust a magnetizing inductor current and a resonant capacitor voltage in a resonant circuit during a burst mode working period of the burst mode, wherein the resonant converter operates at light load or No-load condition during the burst mode; and
providing at least one pulse group to intermittently turn on switching elements of a square wave generator after the first regulation pulse is completed, wherein the first regulation pulse adjusts the magnetizing inductor current and the resonant capacitor voltage, such that at each rising edge of each driving pulse of the pulse group the magnitude of the magnetizing inductor current is essentially the same and the magnitude of the resonant capacitor voltage is essentially the same.

19. The burst mode control method as claimed in claim 18, wherein the magnetizing inductor current has a positive peak value and a negative peak value, and the resonant capacitor voltage has a first voltage value corresponding to the positive peak value, a second voltage value corresponding to the negative peak value and an intermediate value, when the resonant converter operates in a balanced state under the normal mode.

20. The burst mode control method as claimed in claim 19, wherein the first regulation pulse is used to adjust the magnetizing inductor current and the resonant capacitor voltage to the positive peak value and the first voltage value.

21. The burst mode control method as claimed in claim 19, further comprising providing at least one second regulation pulse subsequent to the pulse group and antecedent to the first regulation pulse to adjust the resonant capacitor voltage in the resonant circuit to the intermediate value, wherein the intermediate value is between the first and the second voltage values.

22. The resonant converter as claimed in claim 18, wherein the amount of the first regulation pulse(s) is not greater than M+2 when the amount of resonant elements is M.

23. The burst mode control method as claimed in claim 18, wherein the pulse width of the first regulation pulse is simultaneously adjusted by detecting the magnetizing inductor current and the resonant capacitor voltage.

* * * * *